United States Patent [19]

Hatanaka et al.

[11] Patent Number: 5,260,840
[45] Date of Patent: Nov. 9, 1993

[54] PCM SIGNAL RECORDING SYSTEM

[75] Inventors: Yuji Hatanaka; Toshifumi Takeuchi; Takao Arai, all of Yokohama, Japan

[73] Assignee: Hitachi, Ltd., Tokyo, Japan

[21] Appl. No.: 851,879

[22] Filed: Mar. 16, 1992

[30] Foreign Application Priority Data

Mar. 18, 1991 [JP] Japan .................. 3-052184

[51] Int. Cl.5 ............................................. G11B 5/09
[52] U.S. Cl. .................................... 360/48; 360/19.1; 360/33.1
[58] Field of Search ............... 360/48, 32, 47, 53, 360/19.1, 33.1

[56] References Cited

U.S. PATENT DOCUMENTS

| | | | |
|---|---|---|---|
| 4,646,171 | 2/1987 | Okada et al. | 360/32 |
| 4,685,004 | 8/1987 | Takahashi et al. | 360/48 |
| 4,937,686 | 1/1990 | Arai et al. | 360/32 |
| 5,068,752 | 11/1991 | Tanaka et al. | 360/19.1 |
| 5,144,500 | 9/1992 | Okada et al. | 360/32 |

FOREIGN PATENT DOCUMENTS 31384 2/1990 Japan .

Primary Examiner—John Shepperd
Assistant Examiner—Jhihan Clark
Attorney, Agent, or Firm—Antonelli, Terry, Stout & Kraus

[57] ABSTRACT

A segmentation system in which, in recording a PCM audio signal on a magnetic tape or the like, a signal divided in 5 per field is divided into 4 segments per field with high capabilities of error correction and a mean value interpolation for burst errors etc. Regarding the signal of a deep-layer record PCM format, in which each subframe (3 in FIGS. 1(a)-1(c)) is formed of 30 blocks of only even data or odd data and in which data frames (4) each including 1 subframe of the even data and 1 subframe of the odd data in combination are formed in the number of 5 per frame, the even data items are arranged in the first half part of a PCM record area on the tape, and the odd data items in the latter half part. Further, each superblock (1) is constituted by 2 blocks adjacent to each other, a C2 parity (22) of 3 superblocks being an error correcting parity is extracted from 1 subframe, with every 4 of the remaining 12 superblocks forming 1 area block (2), and the 3 area blocks are located in 3 segments differing from one another. In the case where the PCM audio signal is recorded by an HD VTR or the like by utilizing the signal processing of the deep-layer record PCM format, the segmentation warrants high capabilities for mean value interpolation and error correction for burst errors etc.

12 Claims, 8 Drawing Sheets

FIG. 3 (PRIOR ART)
HD VTR
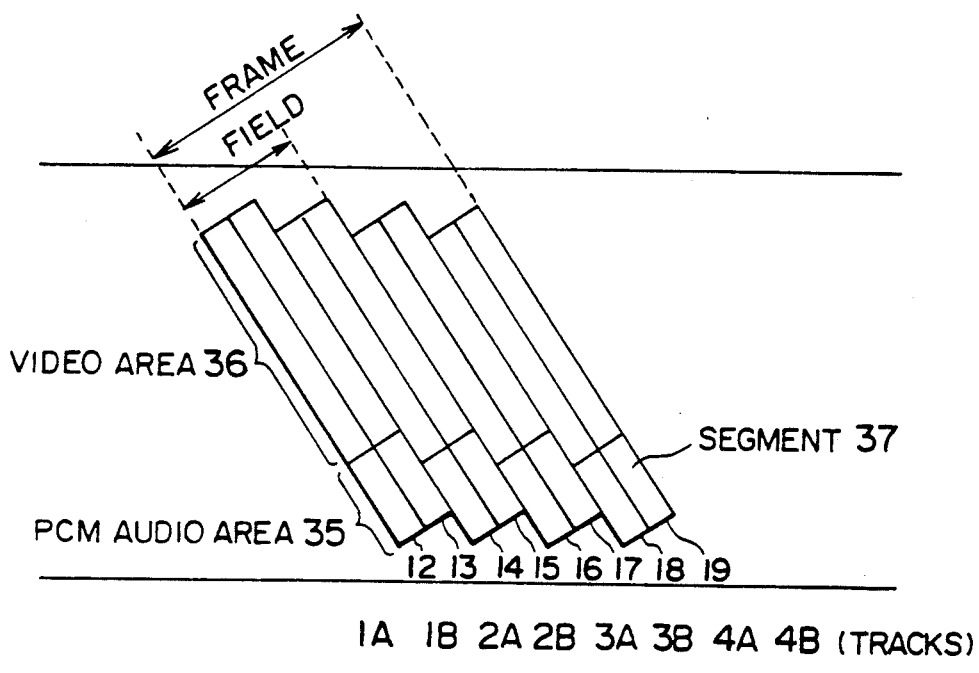
(a) TRACK RECORD PATTERN
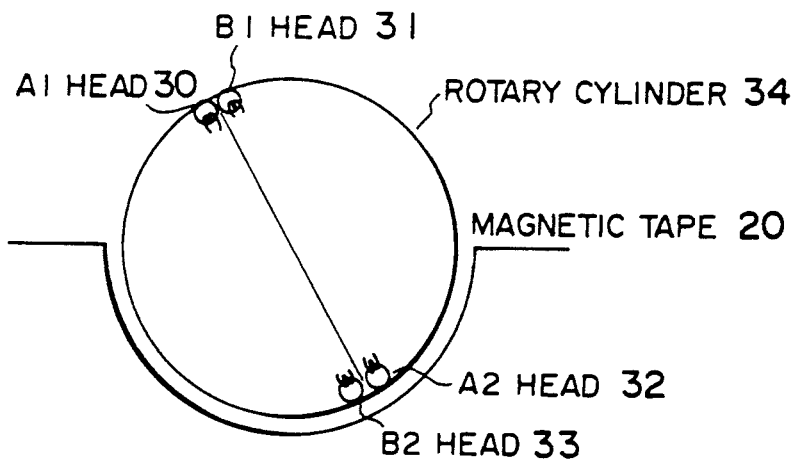
(b) ROTARY HEADS AND CYLINDER

FIG. 5

| | EVEN | C2 | ODD |
|---|---|---|---|

1A

| E01 | E02 | E01 | E02 | E01 | E02 | E01 | E02 | E01 | O01 | E01 | O01 | O00 | O01 | O00 | O01 | O00 | O01 | O00 | O01 |
|---|---|---|---|---|---|---|---|---|---|---|---|---|---|---|---|---|---|---|---|
| 3 | 11 | 4 | 12 | 5 | 13 | 6 | 14 | 0 | 0 | 1 | 1 | 3 | 11 | 4 | 12 | 5 | 13 | 6 | 14 |

~12

1B

| E03 | E01 | E03 | E01 | E03 | E01 | E03 | E01 | E03 | O02 | O01 | O00 | O02 | O00 | O02 | O00 | O02 | O00 | O02 | O00 |
|---|---|---|---|---|---|---|---|---|---|---|---|---|---|---|---|---|---|---|---|
| 7 | 7 | 8 | 8 | 9 | 9 | 10 | 10 | 2 | 2 | 2 | 2 | 7 | 7 | 8 | 8 | 9 | 9 | 10 | 10 |

~13

2A

| E01 | E02 | E01 | E02 | E01 | E02 | E01 | E02 | O00 | E02 | O00 | E02 | O00 | O01 | O00 | O01 | O00 | O01 | O00 | O01 |
|---|---|---|---|---|---|---|---|---|---|---|---|---|---|---|---|---|---|---|---|
| 11 | 3 | 12 | 4 | 13 | 5 | 14 | 6 | 0 | 0 | 1 | 1 | 11 | 3 | 12 | 4 | 13 | 5 | 14 | 6 |

~14

2B

| E02 | E03 | E02 | E03 | E02 | E03 | E02 | E03 | O02 | O02 | O01 | O02 | O01 | O02 | O01 | O02 | O01 | O02 | O01 | O02 |
|---|---|---|---|---|---|---|---|---|---|---|---|---|---|---|---|---|---|---|---|
| 7 | 11 | 8 | 12 | 9 | 13 | 10 | 14 | 2 | 0 | 2 | 1 | 7 | 11 | 8 | 12 | 9 | 13 | 10 | 14 |

~15

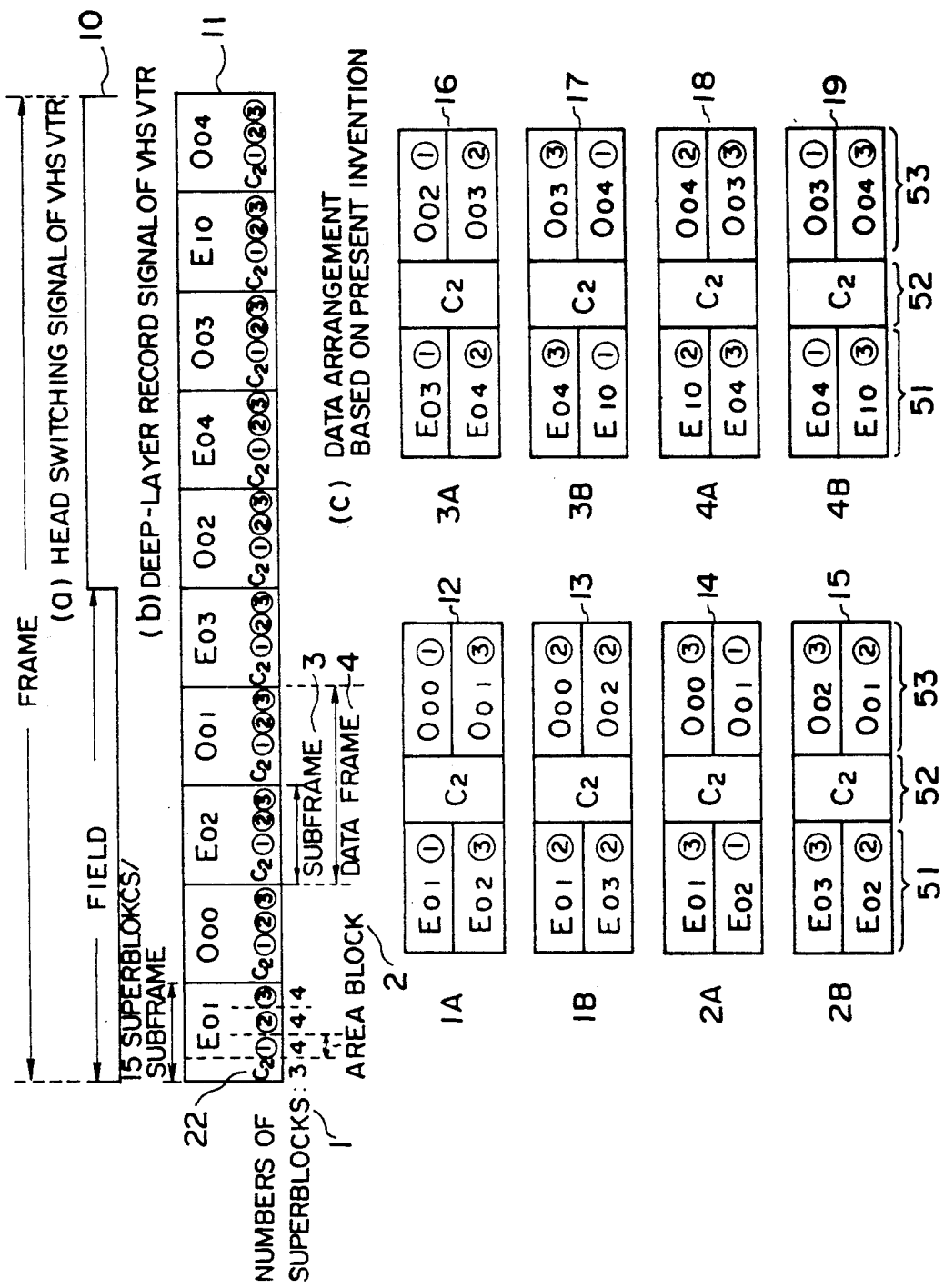

PCM SIGNAL RECORDING SYSTEM

BACKGROUND OF THE INVENTION a) Field of the Invention

The present invention relates generally to a PCM(pulse code modulation) recorder which records a PCM signal along with a video signal by the use of rotary heads, and particularly to a recording system which is well suited to record a PCM signal on a tape after segmenting each field of the PCM signal.

b) Description of the Related Art

A system wherein a PCM audio signal is recorded along with a video signal by the use of rotary heads, is as disclosed in, for example, Japanese Patent Application Laid-open No. 31384/1990. Herein, each frame of the PCM audio signal is divided into five pieces, and each of the pieces is divided into two groups of even data items being the even-numbered data of the PCM audio signal and odd data items being the odd-numbered data thereof. The groups of even data items and odd data items are interleaved so that each frame is divided into a total of ten subframes for recording.

With this system, even when a dropout or a similar signal omission has occurred on a tape to render the reproduction of one subframe impossible, the audio signal is able to be reproduced by performing a mean value interpolation or the like from the preceding and succeeding data items. Further, it is contrived to shorten the recording/reproduction delay of the PCM audio signal relative to the video signal (AV delay). In an S-VHS VTR, accordingly, the system has become the basic format for recording the PCM signal in the deep-layer part of the tape.

Meanwhile, in an HD VTR which records the video signal of a so called "high vision" system of high definition, as illustrated in FIGS. 3(a) and 3(b), a rotary cylinder 34 on which two pairs of magnetic heads 30, 31 and 32, 33 are mounted in 180° opposition is held faced to the surface of a magnetic tape 20 and is rotated at a frequency of 60 Hz being double the frame frequency of the NTSC system. Herein, a high-density recording is realized by forming record areas of 8 tracks per frame. The high-vision video signal and the PCM audio signal are subjected to timebase compression, and the resulting signals are respectively recorded in the corresponding areas 36 and 35 of the 8 tracks in time division. Those individual areas 37 of the area 35 in which the PCM audio signal is recorded, are referred to as "segments".

As regards the PCM audio signal of the HD VTR, in consideration of shortening a term for development and making circuitry common in a compatible set, it is thought advantageous that, as shown in FIG. 4, a signal processing circuit corresponding to the deep-layer recording PCM format of the S-VHS VTR can be utilized for recording the PCM audio signal of the HD VTR on the basis of the PCM format of the S-VHS VTR.

In the case of diverting the PCM format of the VTR of the S-VHS system to the PCM audio signal of the HD VTR, it should be noted that each frome of the PCM audio signal is divided into the ten subframes in the S-VHS VTR, whereas it is formed of the eight segments in the HD VTR, as mentioned above. Therefore, the PCM data divided by ten needs to be converted (rearranged) into the PCM data divided by eight.

It is important in the conversion to secure the capability of error corrections for the omissions of a reproduced signal attributed to dropouts etc. in the reproduction mode (i.e., the highest percentage of correctable data errors) and the capability of audio outputs (i.e., the reproduction of uncorrectable audio data as based on an interpolation), to simplify regulations in the conversion, and so forth.

By way of example, in a case where the interval between the even data and the corresponding odd data which arise within an identical time unit is short on the tape, the reproduction of temporally successive data items is rendered impossible even by a burst error of comparatively short duration. In addition to this, the processing of a mean value interpolation or the like fails to be performed.

With a scheme wherein the error correction is completed with a large number of tracks, there is the problem that, when a reproduction defect has occurred extending over one track, the error corrections of all the blocks becomes impossible.

SUMMARY OF THE INVENTION

It is accordingly an object of the present invention to provide a PCM signal recording system in which, in recording a PCM audio signal on a magnetic tape or the like, a signal divided into five per field is rearranged into four segments per field with high capabilities of error correction and a mean value interpolation for burst errors etc.

In order to accomplish the object, regarding the signal of a deep-layer record PCM format, in which each subframe is formed of thirty blocks of only even data (or odd data) and in which data frames each including 1 subframe of the even data and one subframe of the odd data in combination are formed in the number of 5 per frame, selected even data items (or odd data items) are arranged in the first half part of a PCM record area on a tape, and selected odd data items (or even data items) in the latter half part.

Further, in the signal of the deep-layer record PCM format, each "superblock" (larger block) is constituted by two blocks adjacent to each other, a C2 parity of three superblocks being an error correcting parity (for example, the Reed-Solomon code) is extracted from one subframe, and the remaining twelve superblocks are divided into three area blocks each including four superblocks. The superblocks divided as described above are rearranged in a record area of eight segments in an HD VTR, as follows:

(1) The area blocks belonging to an identical subframe are distributed to three segments differing from one another.

(2) The area blocks of the even data and those of the odd data, the data items of which arise within the identical time unit, are always located in different tracks.

(3) The data items of the six area blocks in an identical data frame (FIG. 1) are distributed into three segments.

(4) The superblocks of an area block are arranged alternately with superblocks belonging to a different area block.

(5) The C2 parity data of a data frame is divided and located in the middle of each of the three segments to which the 6 area blocks of the data frame belong.

The even data items and the odd data items are separated in the first half and the latter half of an record area, and the area blocks within an identical time unit are located in different segments. Thus, even when one segment has become unreproducible due to a dropout or the like, the odd data (or even data) in the same time unit as that of the defective even data (or odd data) is reproduced normally, and hence, an audio output can be afforded through the processing of a mean value interpolation or the like.

Moreover, an error correction is finished with one data frame in the deep-layer record PCM format, and the superblocks within the single data frame are distributed to three segments. Thus, the error correction is finished with the three segments. Therefore, even in a case where all the data items of one segment per field have become unreproducible, the error correction can be made normally with the remaining 3 segments. Further, superblocks of one area block are located alternately with the super-blocks belonging to a different area block. Thus, the interleave length of the error correction increases, and the correcting capability for a burst error is enhanced.

BRIEF DESCRIPTION OF THE DRAWINGS

FIGS. 3(a) and 3(b) are diagrams showing the recording system of an HD VTR;

FIG. 5 is a diagram showing a data arrangement on tracks in the first half of a field;

FIGS. 8(a) thru 8(c) are diagrams showing a record format in still another embodiment.

DETAILED DESCRIPTION OF THE PREFERRED EMBODIMENTS

Figure 1:
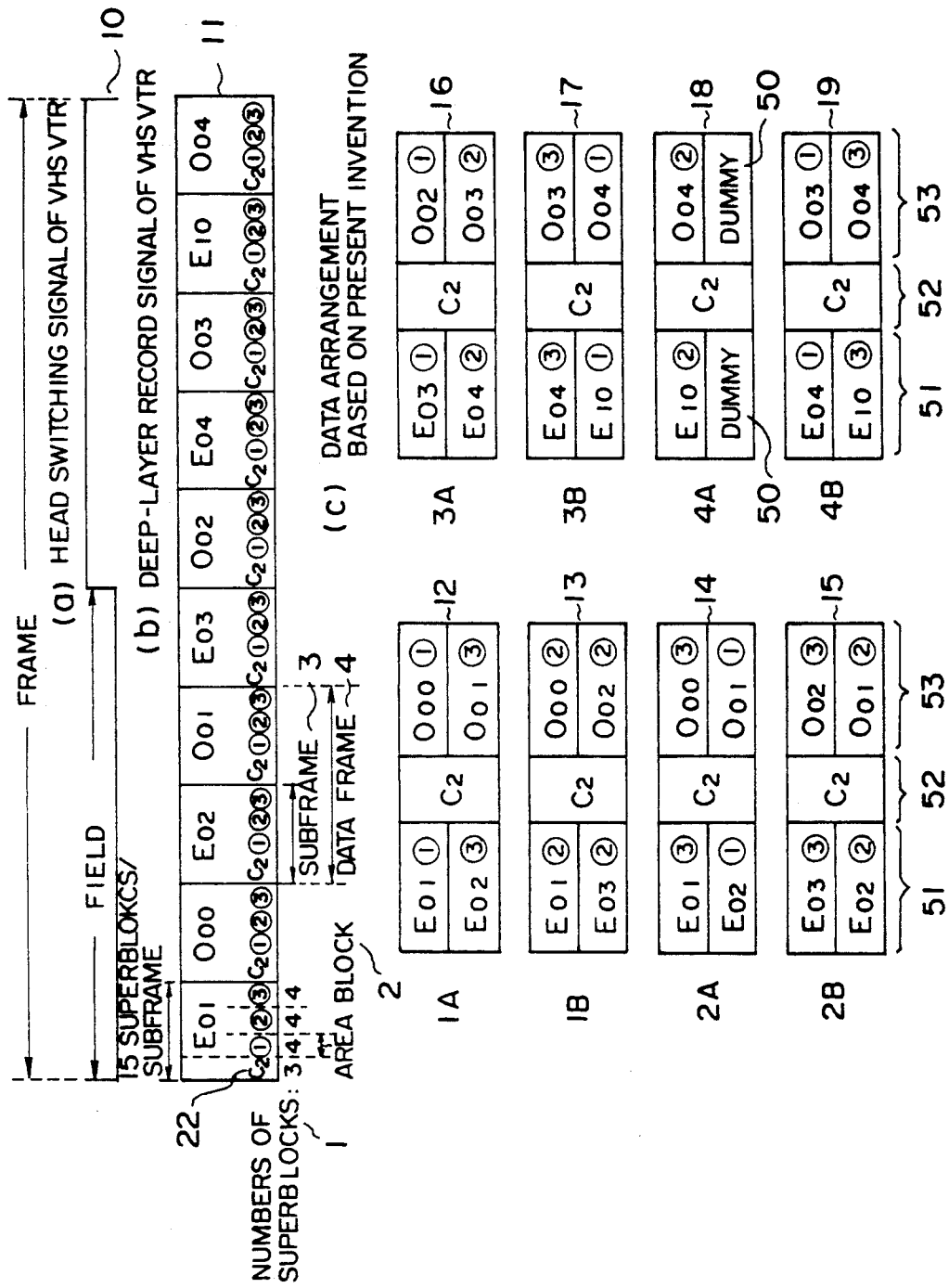
FIGS. 1(a) thru 1(c) are diagrams for elucidating a record format according to the present invention.

FIGS. 1(a)-1(c) illustrate a method fo segmenting the signal of that deep-layer record PCM format of an S-VHS VTR in which each frame is divided in ten, into eight segments per frame, namely, four segments per field. FIG. 1(a) shows the head switching signal 10 of the VHS VTR, FIG. 1(b) shows the deep-layer record format 11, and FIG. 1(c) shows a format 12-19 after the segmentation into the eight segments. In the figures, letter 'E' denotes the data of the even-numbered samples of the audio signal, while letter O denotes the data of the odd-numbered samples.

Figure 2:
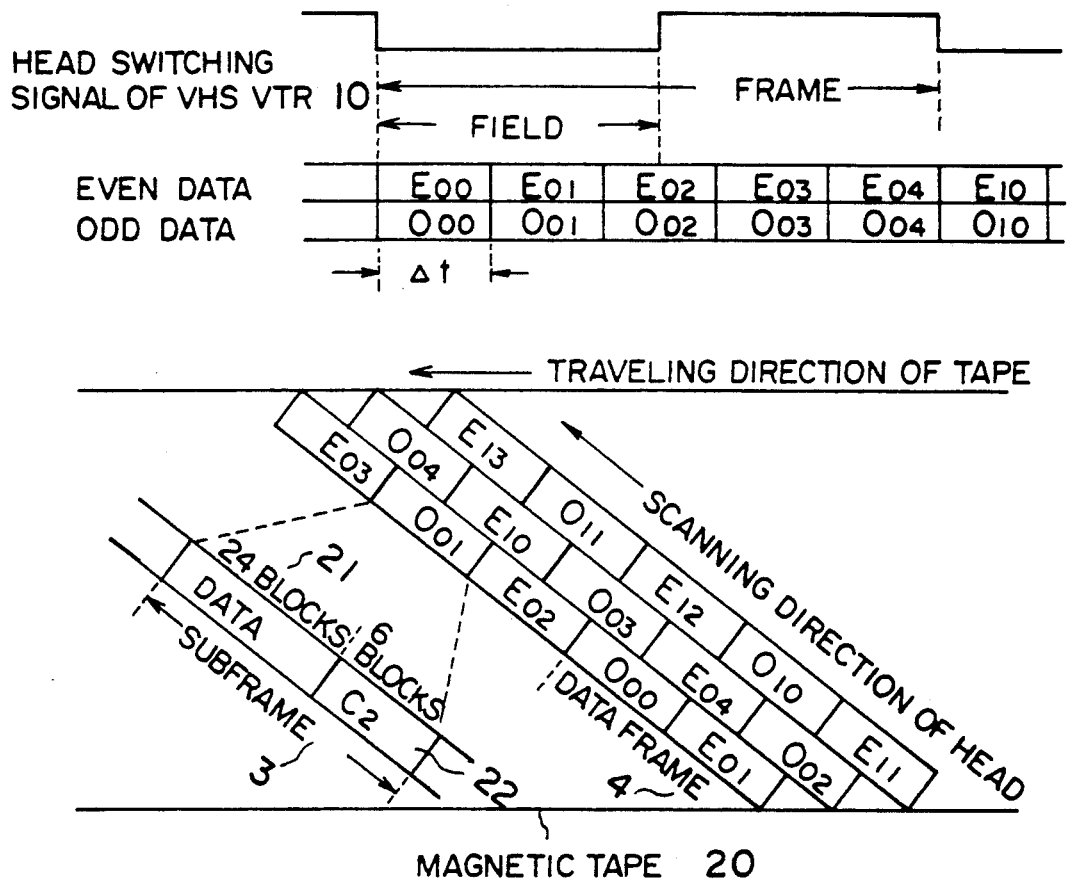
FIG. 2 is a diagram showing a deep-layer record PCM format.

As shown in FIG. 2, in the deep-layer record PCM format, the audio signal in each frame (30 Hz) is divided into five pieces each having a time unit $\Delta t$, each of the even data and the odd data in each of the pieces is subdivided into twenty four blocks, and an error correcting parity C2 of twelve blocks is generated to each combination of both the even and odd data items. A "subframe" indicated at numeral 3 includes the twenty four blocks of data indicated at numeral 21 and a half of the twelve blocks of C2 parity indicated at numeral 22. The even data $E_{00}$ and the odd data $O_{00}$ are audio PCM data items sampled within the identical time unit Dt. The data $E_{00}$ is the even-numbered sample data, while the data $O_{00}$ is the odd-numbered sample data. In this embodiment, each block is composed of PCM data of 31 bytes and a header of 4 bytes indicative of the head or the like of the block. The subframe of the even data in a certain time unit and that of the odd data in a different time unit are combined into one data frame indicated at numeral 4. In this way, the data items are output so as to be recorded on a magnetic tape 20 in a sequence as depicted in the lower part of FIG. 2. Accordingly, the audio signal to be recorded has a formation in which each field is divided into five subframes.

Meanwhile, since the video signal of the high vision system being higher in definition than that of the NTSC system has a higher transmission rate, it cannot be recorded and reproduced by the VTR of the VHS system. With the high vision system, a high-density recording is realized by endowing each field with a record area of 4 tracks as illustrated in FIG. 3(a). As shown in FIG. 3(b), a total of four heads are mounted on a rotary cylinder 34 in such a manner that the A1 head 30 and the B1 head 31 are held in adjacency to each other, while the A2 head 32 and the B2 head 33 are held in adjacency to each other in 180° opposition to the heads 30 and 31. The rotary cylinder 34 is rotated at a frequency of 60 Hz which is double the frequency of the NTSC system. By way of example, the A1 head 30 scans tracks 1A12 and 3A16 in a record pattern shown in FIG. 3(a), and the B2 head 33 scans tracks 1B 13 and 3B 17. The head entrance sidearea of the four tracks per field is used for a PCM audio area 35, and the remaining area is used for a video area 36, whereupon the PCM audio signal and the video signal subjected to timebase compression are respectively recorded in the corresponding areas. The part of each track in the PCM audio area 35 is called a "segment", and each field includes four segments.

As to formats of the error correction, interleave operation, etc. of the PCM audio signal which is to be recorded in the PCM audio area, the utilization of the S-VHS deep-layer record PCM format stated before makes it possible to employ an existing signal processing circuit and makes it unnecessary to develop an entirely new circuit. Further, in a compatible set in which the video signal and deep-layer record PCM audio signal of the S-VHS system are able to be recorded by the HD VTR, a signal processing circuit can be shared very advantageously. In this regard, however, each field is divided by five in the deep-layer record PCM format as shown in FIG. 2, whereas each field is divided into the four segments in the system of the HD VTR. Therefore, the processing of the segmentation of the deep-layer record PCM signal is required.

Figure 4:
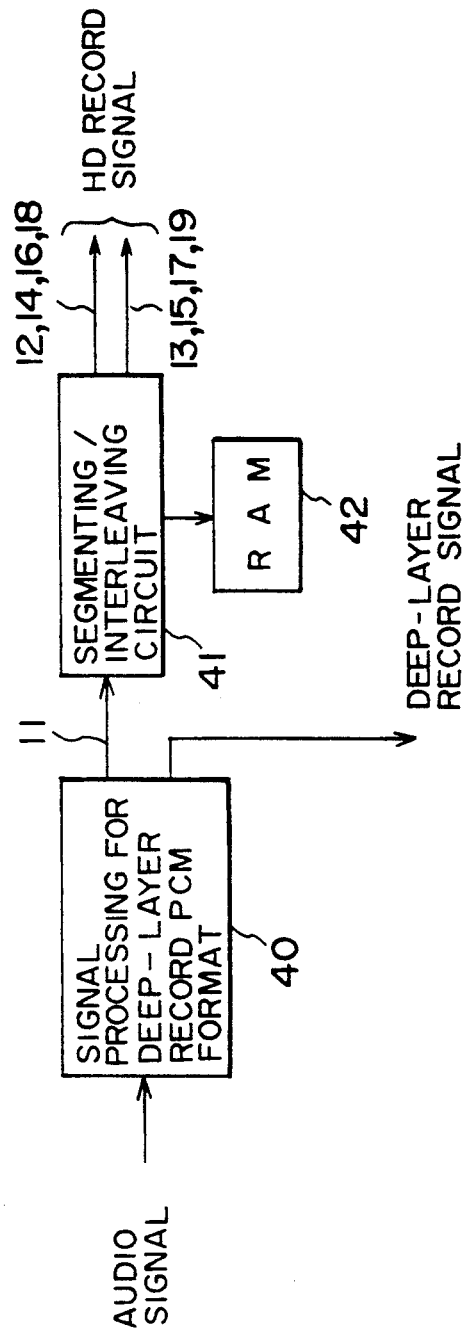
FIG. 4 is a block diagram for explaining audio signal processing.

That is, as shown in FIG. 4, an HD record signal at numerals 12-19 needs to be generated by providing a circuit arrangement in which the output 11 of a signal processing circuit 40 for the deep-layer record PCM format is converted into the 4 segments/field formation by a segmenting/interleaving circuit 41. In a case where the audio signal is to be recorded in conformity with the VHS system by the HD/S-VHS compatible set, the output of the signal processing circuit 40 may be used directly. A RAM 42 functions as a buffer which the segmenting/interleaving circuit 41 uses for its processing.

Here, as regards the segmentation which proceeds in the interleaving circuit 41, note needs to be taken of the following:

(1) Even when a burst error has occurred on the magnetic tape 20, a mean value interpolation is made possible.

(2) In a case where error corrections are dispersed so as to finish each of them with a large number of segments, the errors of a large number of data items cannot be corrected when one segment has become unreproducible. Therefore, each error correction is finished with a small number of segments.

(3) In a case where a plurality of areas with which error correction is completed are concentrated in a zone of small area on the magnetic tape 20, a capability for correcting a burst error degrades. Therefore, the plurality of areas are arranged a suitable distances apart.

(4) An audio output is made possible even when one whole segment has become unreproducible.

(5) The delay of a reproduction timing of the PCM audio signal relative to the video signal, the delay being ascribable to recording and reproduction, is minimized. (Usually, the PCM audio signal is subjected to processes such as error correction and interleave operations, so that the delay of the output timing, called "AV delay", is involved through the recording and reproduction.)

An example of a segmenting method which satisfies the above requirements is illustrated in FIGS. 1(a)-1(c).

First, a method of dividing the deep-layer record signal 11 of the VHS VTR will be described.

Letting two blocks constitute one superblock (1 larger block) indicated at numeral 1, one subframe indicated at numeral 3 is composed of fifteen superblocks. Among the fifteen superblocks, three superblocks forming an error correcting parity C2 indicated at numeral 22 are extracted, and the remaining twelve superblocks of PCM data are divided into three parts, each consisting of four superblocks. The part of four superblocks as denoted by numeral 2 is referred to as an "area block". The data of 1 frame can be divided into even data and odd data each consisting of fifteen area blocks, that is, the PCM data consisting of thirty area blocks in total, and the parity codes C2 of thirty superblocks.

On the other hand, each of the segments 12-19 of the HD VTR system is formed of forty blocks (twenty super-blocks), of which the first 8 superblocks are set as an even data area 51, the last 8 superblocks as an odd data area 53, and the middle 4 superblocks as a parity C2 area 52. With the above formation, the even data and the odd data each consisting of 2 area blocks can be arranged in one segment, so that the PCM data of the even data and the odd data each consisting of 16 area blocks can be recorded in one frame according to the format shown in FIG. 1(c).

Accordingly, thirty area blocks of each frame of the deep-layer record signal 11 are turned into 32 area blocks by affixing dummy data 50 of 2 blocks thereto, and the 32 area blocks are arranged in the 16 area blocks of the even data area 51 of the HD VTR and those of the odd data area 53.

Besides, the parity C2 codes exist in 30 ($=3 \times 10$) superblocks per frame as stated before. On the other hand, the C2 area 52 of all the segments of the HD VTR system includes 32 ($=4 \times 8$) superblocks. As in the case of the PCM data, therefore, two dummy C2 data items (60 in FIG. 6 to be referred to later) are affixed to the C2 data of thirty superblocks, the resulting thirty-two superblocks of the C2 data are divided into eight data items each consisting of four superblocks, and these data items are distributed to the respective eight segments.

In order to meet the foregoing requirements (1)-(5), data arrangement is performed as follows:

(a) The areas of even data and odd data are separated on a tape.

(b) Area blocks belonging to an identical subframe are located in three segments differing from one another. In the case of FIGS. 1(a)-1(c), by way of example, the area blocks $E_{01}\textcircled{1}$, $E_{01}\textcircled{2}$ and $E_{01}\textcircled{3}$ are respectively located in the different segments 1A, 1B and 2A.

(c) The area blocks of the even data and those of the odd data, the data items belonging to an identical time unit, are located in segments differing from each other. In the case of FIGS. 1(a)-1(c), by way of example, the area block $E_{01}\textcircled{1}$ and the corresponding area block $O_{01}\textcircled{1}$ are respectively located in the different segments 1A and 2A.

(d) An error correction is completed with three segments.

(e) As far as possible, the data of the deep-layer record signal 11 in the first field of the frame is located in the first field also in the HD VTR system, while the data of the deep-layer record signal 11 in the latter field of the frame is located in the latter field also in the HD VTR system.

(f) Within each segment, individual superblocks are located so that the superblocks to adjoin after the conversion may belong to data frames differing from each other.

The arrangement of the area blocks based on the above expedients (a)-(f) is as exemplified in FIG. 1(c). For example, the three area blocks of the first even subframe $E_{01}$ in the deep-layer record signal 11 are respectively located in the three segments 1A, 1B and 2A as stated before, and those of the odd subframe $O_{01}$ in the second data frame are respectively located in the segments 2A, 2B and 1A.

Owing to the expedients (a) and (c), even when the reproduction of one segment has become entirely defective, data items adjacent on a time base as sampled in the same time unit are normally reproduced. Therefore, the processing of a mean value interpolation or the like can be carried out, and the requirements (1) and (4) are met.

Owing to the expedient (d), the requirement (2) is met. Even when the reproduction of the data of one segment is defective, the completion of the error correction with the three segments warrants the presence of data for the normal error correction within one field. If the error correction is completed with four segments, all error corrections in one field become impossible.

Moreover, owing to the expedient (e), the AV delay in the requirement (5) can be shortened. Incidentally, the data frame composed of the subframes $E_{03}$ and $O_{02}$ are located astride two fields in the HD VTR system.

Figure 6:
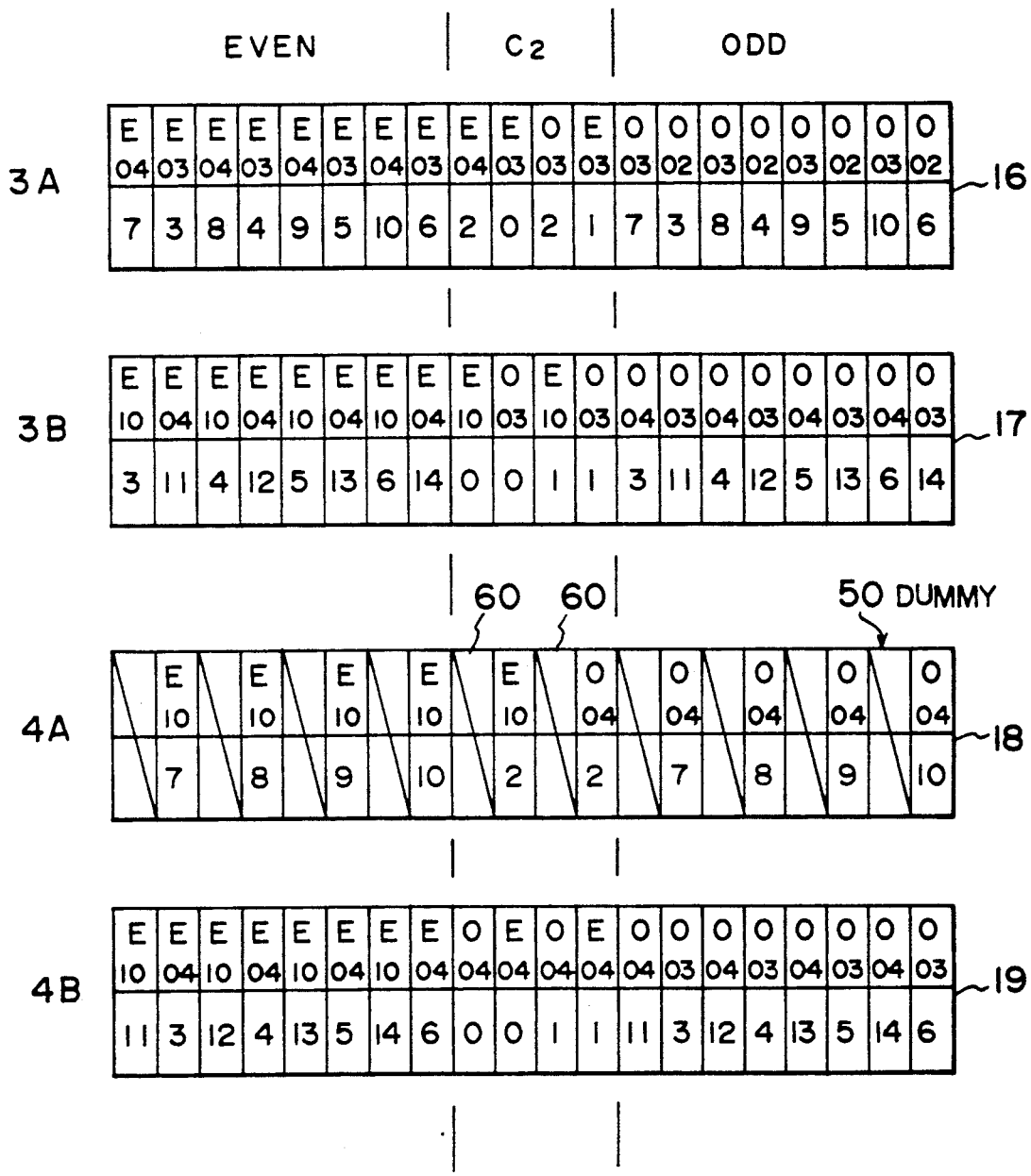
FIG. 6 is a diagram showing a data arrangement on tracks in the latter half of the field.

FIG. 5 and FIG. 6 show an example of the detailed format of the first field consisting of the segments 1A, 1B, 2A and 2B and the latter field consisting of the segments 3A, 3B, 4A and 4B of the segmented signal, respectively. Here, as to numerals at the lower stages of the segments, "0"-"2" denote the superblocks the error correcting codes C2 (22), "3"-"6" denote those belonging to the first area blocks ① in the subframes, "7"-"10" denote those belonging to the middle area blocks ②, and "11"-"14" denote those belonging to the last area blocks ③. As seen from the figures, owing to the expedient (f), even when a burst error being four superblocks long has occurred by way of example, it leads to the defective reproduction of two superblocks in one error correcting system. Thus, the capability of correcting burst errors is enhanced, and the requirement (3) is satisfied.

In the example of FIGS. 5 and 6, the superblocks of the subframe $O_{02}$ are arranged in the segments 1B, 2B and 3A in consideration of the requirement (c). In this case, that part $O_{02}\textcircled{2}$ of the subframe $O_{02}$ which ought to appear in the latter half of one frame is included in the segment 1B of the first-half segment group. Due to this fact, the generation of the segment 1B must wait until the latter half of the frame. As a result, the AV delay lengthens disadvantageously.

Figure 7:
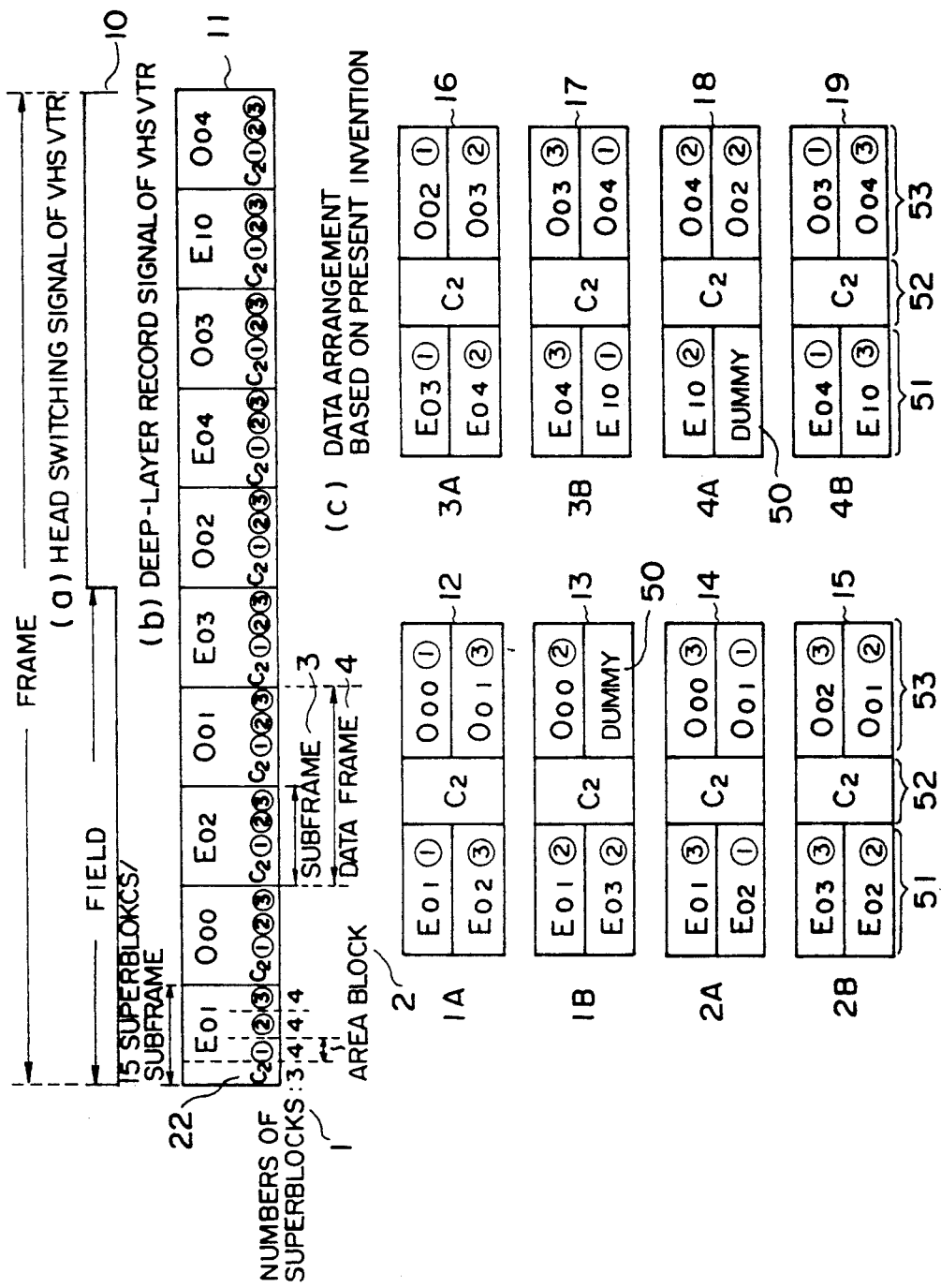
FIGS. 7(a) thru 7(c) are diagrams showing a record format in another embodiment.

In order to avoid the disadvantage, the area block $O_{02}$ ② is located in the segment 4A as shown in FIG. 7(c), whereby the AV delay can be shortened. In the case of FIGS. 7(a)-7(c), the magnitude of the AV delay becomes 1 frame plus 11 milliseconds or so. Regarding the subframe $O_{02}$, however, the data frame to be subjected to an error correction includes the subframes $O_{02}$ and $E_{03}$, so that the error correction must be completed with the four segments 1B, 2B, 3A and 4A.

FIGS. 8(a)-8(c) illustrate an example of a method in which two area blocks are recorded in duplicate without forming any dummy data. Here, the area blocks $E_{04}$ ③ and $O_{03}$ ③ are duplicated. This method has the advantages that the completion of an error correction with three segments is held and that, even when the reproduction of one of the data items has become defective, the other data item can be used.

Although the VTR of the video signal whose frame is of 30 Hz has been mentioned in the above, the present invention is also applicable to a system whose frame is of 25 Hz.

According to the present invention, in a case where a PCM audio signal is to be recorded with an HD VTR or the like by utilizing the signal processing of a deep-layer record PCM format, a segmentation which heightens the capabilities of mean value interpolation and error correction for burst errors is realized in spite of the unequal numbers of areal divisions per field.

What is claimed is:

1. A PCM signal recording system which records a digital signal on a recording medium by the use of recording heads, comprising:

signal processing means to generate M data frames (where M denotes an integer of at least 2) every predetermined period T from digital data indicative of sample values of a signal to be recorded within said period T;

said M data frames being generated such that said digital data is divided into M data pieces of M time units, that each of the resulting data piece within each time unit is sub-divided into two, even data item E corresponding to the even-numbered samples and odd data item O corresponding to the odd-numbered samples, and that each of said data frames is formed by a selected combination of said even data item E, said odd data item O and an error correcting code C attached to the both data items; and segmentation means to rearrange said M data frames generated from said signal processing means, into N segments (where N denotes an integer of at least 2 differing from said integer M);

the segmentation being performed such that each of said even data E, said odd data O and said error correcting code C of each of said M data frames is divided into a plurality of elements, that the elements of all the even data items E, those of all the odd data items O and those of all the error correcting codes C are respectively distributed into N groups, and that each of said segments is formed by combining the corresponding ones of said groups of said even data items E, said odd data items O and said error correcting codes C, while locating said error correcting code C between said corresponding groups of said even data items E and said odd data items O.

2. A PCM signal recording system as defined in claim 1, wherein said integer M is equal to 5, while said integer N is equal to 8.

3. A PCM signal recording system as defined in claim 1, wherein said segmentation means divides said even data item E into three elements E1, E2 and E3, while dividing said odd data item O into three elements O1, O2 and O3.

4. A PCM signal recording system as defined in claim 3, wherein the elements of said even data item E and the corresponding elements of said odd data item O, said even and odd data items in the same time unit, are contained in segments different from each other.

5. A PCM signal recording system as defined in claim 3, wherein said segmentation means causes said three elements E1, E2 and E3 of said even data item E to be stored in three segments different from one another and also causes said three elements O1, O2 and O3 of said odd data item O to be stored in three segments different from one another.

6. A PCM signal recording system as defined in claim 2, wherein an error correction is completed with three of said eight segments.

7. A PCM signal recording system as defined in claim 6, wherein a case coexists where an error correction is completed with four of said eight segments.

8. A PCM signal recording system as defined in claim 3, wherein said each data frame is composed of said even data item of 24 blocks, said odd data item of 24 blocks and said error correcting code of 12 blocks; each of said elements of said even data item and said odd data item is composed of 8 blocks; each of said elements of said error correcting code is composed of 2 blocks; and said each segment is composed of 2 elements of said even data item 2 elements of said odd data item and 4 elements of said error correcting code.

9. A PCM signal recording system as defined in claim 8, wherein 2 blocks constitute a super block, and the superblocks belonging to the different elements are located in adjacency to each other within said segment.

10. A PCM signal recording system as defined in claim 1, wherein said each segment has an area of fixed length which stores therein the elements of said even data item and said odd data item and the elements of said error correcting code, and dummy data is stored in a part of said area to which no element is assigned.

11. A PCM signal recording system as defined in claim 1, wherein said each segment has an area of fixed length which stores therein the elements of said even data item and said odd data item and the elements of said error correcting code, and the same element located in a part of said area is stored in another part of said area to which no element is assigned.

12. A PCM signal recording system as defined in claim 1, wherein said signal to be recorded is an audio signal, said digital signal is a PCM audio signal, said recording heads are rotary heads, and said recording medium is a magnetic tape.

* * * * *